Patented May 25, 1937

2,081,154

UNITED STATES PATENT OFFICE 2,081,154

ARTIFICIAL RESIN AND METHOD OF MAKING THE SAME

Israel Rosenblum, Jackson Heights, N. Y.

No Drawing. Application January 2, 1931,
Serial No. 506,298

10 Claims. (Cl. 260—8)

My invention relates to artificial or synthetic resins and has for its object to produce a resin of very complex character which is soluble in toluol or other aromatic solvents, in petroleum distillates, and in mixtures of such solvents, or in fatty oils and their fatty acids, particularly those derived from drying, semi-drying and non-drying oils, is miscible with varnish oils, with oil varnishes, enamels and paints, and with varnish resins, and is suitable for use as a vehicle for enamels, and particularly for baking enamels, and especially where white enamels are desired.

It is a particular object of the present invention to produce a material of the kind above specified which bakes to more nearly a pure white with suitable white enamel pigments than has hitherto been attained with known similar enamel vehicles.

It is also an object of the invention to produce a resinous material which can be used as a vehicle also for paints, varnishes and other coating compositions when mixed with suitable oils, such as linseed oil and China-wood oil, and also one which may be plastic and may be used with fillers as a molding composition.

The present invention contemplates further the production of a vehicle for enamels, paints, varnishes, etc. capable of yielding a hard, tough film having the property of adhering tenaciously to various kinds of surfaces including tin or tinned plate.

Other objects of the invention will become apparent from the following description and the features of novelty will be pointed out in the appended claims.

In carrying out the present invention, a polyhydric alcohol, a polybasic aromatic acid, a polybasic aliphatic acid, preferably of the maleic group (that is maleic acid, malic acid, malo-malic acid, or their substitution products or derivatives), and one or more monobasic acids composed of or derived from a natural or synthetic resin (such as a soluble, fusible phenol-aldehyde resin) or from a drying or non-drying oil or from fats, waxes, etc. at least one of such monobasic acids being derived from a drying or non-drying oil or from a fat, wax, etc., and preferably from linseed oil, are caused to react in such a manner that a highly complex resinous molecule is obtained which may be regarded as a condensed mixed ester of the polyhydric alcohol and the several acids employed. Stated more specifically, by way of example, the present invention involves the esterification of glycerol, phthalic acid, maleic acid and linoleic acid, and also if desired, one or more of the following organic acidic materials: an acidic phenol-aldehyde resin, and particularly an acidic phenol-formaldehyde-organic salt complex; a natural resin, fresh or fossil, including rosin (wood or stump), congo, copal, manila, kauri, etc.; and the acids, other than linoleic, obtainable from drying, semi-drying, or non-drying oils, or from fats, waxes or such similar oily or fatty materials capable of yielding acids of high molecular weight. The final product obtained by me will thus contain one or more complex substances whose molecules contain residues of at least three acids. Where a dihydric alcohol is employed such three-acid esters may result from the condensation of two or more partially or completely esterified dihydric alcohol molecules. Still more highly complex molecules are obtained by me by condensing complex esters having free hydroxyls with a weak inorganic polybasic acid such as boric acid, or their anhydrides. I may use such inorganic polybasic acid in place of a part or of all of the maleic or equivalent acid.

An important feature of the present invention resides in the fact that when the constituents of the resin consist entirely, for example, of glycerol, phthalic acid, maleic acid, and a fatty oil acid, such as linoleic acid or an equivalent acid derived from drying and non-drying fatty oils and from fats, comparatively small quantities of the polybasic aliphatic acid are employed. I have found that, in general, where only the glycerol, phthalic acid, polybasic aliphatic acid and fatty oil acid are present, the last named acid being employed in a quantity sufficient to produce an oil-soluble resin, the use of too large a proportion of the polybasic aliphatic acid results in the production of a rubbery and insoluble mass before esterification of the fatty oil acid has proceeded to any substantial extent, there being thus formed two immiscible materials or layers so that the product is of no practical value for varnishes, enamels and paints. For best results the quantity of maleic acid, for example, should not exceed about 15 per cent by weight of the phthalic acid employed. I have also found that small quantities of maleic acid or boric acid, or mixtures of both these acids, when combined with the glycerol-phthalic acid monobasic fatty acid ester, or with the glycerol-phthalic acid monobasic fatty acid ester, or with the glycerol-phthalic acid-oil acid-resin acid ester, impart to the product a much better color than has heretofore been obtained so that the product is admirably adapted for use as a vehicle for white baking enamels; in addition, the adhesiveness of the product is greatly improved so that it clings strongly to smooth metallic surfaces of all kinds.

The process, according to the invention may by way of illustration be carried out as follows: 2 mols of phthalic anhydride, 3 mols of glycerol and one mol. of linoleic acid are mixed in a suitable reaction vessel. These proportions are such that only part of the hydroxyls of the glycerol would be esterified were this mixture heated to reaction temperature. In accordance with the present invention there is added to a quantity of the mixture above-mentioned, only so much maleic acid as corresponds to at most about 15% by weight of the phthalic acid. The amount of maleic or equivalent acid that may safely be used will depend in large part upon the quantity of glycerol and fatty oil acid employed, the amount of phthalic acid remaining the same, the permissible amount of maleic acid rising with the amount of glycerol. Where the proportions of the reacting substances are, for example, 1 mol. glycerol to 1 mol. of phthalic acid to ½ mol. of linoleic acid, the amount of maleic acid employed preferably does not exceed 5% by weight of the phthalic acid. These proportions of ingredients yield a product which is plastic at ordinary temperatures, dries to a clear substantially colorless and strongly adherent film, and makes an excellent vehicle for practically white baking enamels, paints, varnishes, etc.

I prefer to cause the reaction between the glycerol and the three acids above enumerated to take the place substantially simultaneously as I have found that when the mixture of phthalic acid, glycerol and linoleic acid are first heated in the absence of the maleic acid, the product darkens readily, and when the final product, obtained after reaction with maleic acid, is dissolved and used in a coating composition, the film produced is relatively dark in color. If, however, the maleic acid is added to the mixture of glycerol and the other two acids, before these substances have reacted to any considerable extent, a product is obtained which is much paler and bakes pale.

The complex material obtained according to the present invention, when, for example, 1½ mols of glycerol, 1 mol. of phthalic acid, and ½ mol. of linoleic acid are employed, contains, among other substances, what may be regarded as a further esterified and probably also further condensed product of the following partial ester of glycerol and phthalic acid:

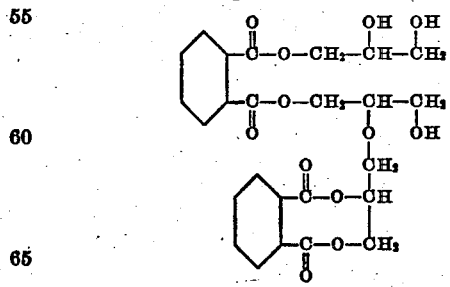

It will be noted that this ester is produced by the condensation of an ester composed of one molecule of phthalic acid and two molecules of glycerol, and containing four hydroxyl groups, with an ester composed of one molecule of phthalic acid and one molecule of glycerol and containing one hydroxyl group. The three hydroxyls remaining after condensation are partially or totally esterified by the maleic, malic or malo-malic acid employed, and by a mixture of organic acids of which the fusible, soluble acidic phenol-aldehyde condensates, linoleic, oleic, stearic, palmitic, ricinoleic, abietic and other oil, fat and natural resin acids are examples, or by a single fatty acid, preferably an unsaturated acid such as linoleic acid. Certain of the hydroxyls of two or more molecules most probably condense to form still more complex molecules. This condensation may be aided by comparatively very small quantities of weak, inorganic acids, such as boric acid, there being in this way obtained a boronized, condensed, esterified polyhydric alcohol, the molecules containing the residues of at least three organic acids. It is impossible to state definitely the formula or structure of the final product obtained as the nature of the esterification and condensation cannot be definitely ascertained by any known means. The initial ester of phthalic acid and glycerol which is structurally represented above is, of course, by no means the only possible ester produced, but is sufficient for an explanation of invention. The mono-basic acids may be used either singly or a mixture of two or more of them may be employed; for example, a natural resin, such as rosin may be employed together with linoleic acid, or together with a phenol-aldehyde condensate and an oil acid. As the phenol-aldehyde condensate, I prefer to employ the acidic phenol-formaldehyde-natural resin-organic salt complex described in my co-pending application Serial No. 371,066, filed June 14, 1929, now Patent 1,808,716.

The organic salt may be a salt of zinc, calcium, strontium, or barium, but I prefer by far to employ the zinc compound. The oxides of metals may be employed, the oxides being neutralized by one or more of the acids present.

It will be understood that the maleic or equivalent polybasic organic acid may operate to condense two or more hydroxylated glycerol-phthalic acid esters and that the boric acid acts in a similar fashion. The boric acid may in fact condense the complex esters of the maleic or equivalent acid, thereby producing resinous molecules of very high molecular weight. The boric acid may be used together with the maleic acid, though each acid may be used alone. While of the polybasic aliphatic acids I prefer to employ maleic, malic and malo-malic acids, and particularly maleic acid, other polybasic aliphatic acids may be employed such as succinic, tartaric, citric, fumaric, malonic, etc. The maleic and boric acid esters in particular appear to affect the fatty acid (i. e. linoleic acid) and the natural resin in such a manner that the final product bakes white (with white pigments) and adheres very strongly to smooth metallic surfaces. In place of the abietic or natural resin acid, I may use the phenol-formaldehyde-organic salt complex above described, which is produced in the presence of a natural resin.

My invention will now be more specifically described with the aid of the following examples, but it is to be understood that these examples are given by way of illustration only and are in no way to be regarded as circumscribing the scope of the invention.

*Example 1*

300 grams of phthalic acid, 300 grams of glycerol, 300 grams of linoleic acid, and 15 grams of maleic acid are heated to 190° C. and kept at this temperature for about ½ hour. The temperature is then gradually raised to about 230° C. and maintained there until a sample removed from the reaction mass is found to be soluble in toluol in substantially all proportions, as well as in fatty acids obtainable upon hydrolysis of drying and non-drying oils. There is thus obtained a resinous material which is characterized particularly by baking pale when used with white coloring matter and by extraordinary adhesiveness upon smooth metallic surfaces, including tin surfaces.

*Example 2*

The procedure outlined in Example 1 is followed except that there are added to the reacting mass 300 grams of a phenol-aldehyde-organic salt complex dissolved in colophony and prepared as described in my above-mentioned Patent No. 1,808,716. The product so obtained, like the other products obtained as hereinabove described, can also be mixed with suitable drying and non-drying oils commonly used in varnish and enamel manufacture, including linseed and China-wood oil If desired, such oils may be added to the initial mixture, or during the reaction, as is well understood in the art. However, because of the more or less darkly colored phenolic condensate, the product will not ordinarily be suitable for white coating compositions.

*Example 3*

The procedure outlined in Example 2 is followed except that, either at the beginning or during the course of the reaction there is added to an amount of the mixture equivalent to about 6 mols ½ mol. of boric acid or oxide. The product so obtained is composed at least in part of the very complex ester produced by the partial esterification of glycerol with phthalic and linoleic acids and with the phenol-aldehyde complex and colophony, by the condensation of such partial ester with maleic acid, and finally by the condensation of such maleic acid esters with boric acid.

*Example 4*

Two mols of phthalic acid, 3 mols of glycerol, 9 grams of maleic acid, 1 mol. of linoleic acid, 300 grams of rosin and ⅙ mol. of boric acid are gradually heated to about 230° C. and maintained at such temperature until the mass is soluble in toluol in substantially all proportions and in fatty acids obtainable upon hydrolysis of drying and non-drying oils.

*Example 5*

300 grams of phthalic acid, 300 grams of glycerol, 15 grams of maleic acid, 300 linoleic acid and ⅙ of a mol. of boric acid are heated to 230° C. until a sample taken from the reaction mass is completely soluble in toluol.

*Example 6*

Any of the procedures given in Examples 1 to 5 may be followed with the exception that in place of the maleic acid there may be used an equivalent amount of malic acid, malo-malic acid, succinic acid, tartaric acid or other polybasic aliphatic acid.

*Example 7*

Any of the procedures described in Examples 1 to 5 may be followed with the exception that in place of the linoleic acid there may be employed other monobasic aliphatic acids obtained upon the hydrolysis of a drying or non-drying oil or of a fat or wax, or a mixture of two or more of these acids, preferably containing also linoleic acid.

The above reactions may be conducted in the presence of a natural resin, either fresh or fossil and either pre-treated or not, as by being heated to a cracking temperature or by being neutralized in whole or in part. In such case, larger amounts of maleic acid may be employed.

By the expression "an acid of the maleic acid group" as used in the claims is to be understood a member of the group composed of maleic acid, malic acid, and malo-maleic acid and their derivatives and substitution products, such as the anhydrides and the haloid acids.

It will be understood that the soluble phenol-aldehyde condensates above referred to may be produced from phenol, cresol, resorcinol, naphthol and other condensed nuclei phenols, their derivatives and substitution products, and from formaldehyde, acetaldehyde or other aldehyde or carbonyl containing compounds, such as the ketones, but soluble condensates produced from ordinary phenol (carbolic acid) and formaldehyde are the most common and are at present preferred by me. By "soluble" I mean, of course, in the solvents usually employed for these substances, and not in water.

Variations from the specific proportions and conditions herein indicated may be resorted to within the scope of the appended claims without departing from the spirit of the invention.

I claim:

1. The method of producing a resinous material which comprises reacting approximately 300 parts of glycerol, 300 parts of phthalic acid, 300 parts of linoleic acid, 15 parts of maleic acid and 300 parts of an acidic phenol-formaldehyde-organic zinc salt reaction product dissolved in rosin.

2. The method of producing a resinous material suitable for use as a vehicle for white baking enamels, which comprises reacting glycerol, phthalic acid, linoleic acid, a dicarboxylic aliphatic acid of the group consisting of maleic, malic, succinic, tartaric and fumaric acids in a quantity up to approximately 12% by weight of the phthalic acid, and boric acid, until the mixture is completely soluble in toluol.

3. The method of producing an oil-soluble resinous material suitable for use as a vehicle for coating compositions, which comprises reacting glycerol, phthalic acid, a fatty acid obtainable upon hydrolysis of a member of the group consisting of fatty oils and fats, maleic acid in an amount not substantially exceeding 15% by weight of the phthalic acid, a fusible, soluble phenol-aldehyde-organic salt reaction product and boric acid.

4. The method of producing an oil-soluble resinous material suitable for use as a vehicle for coating compositions, which comprises reacting glycerol, phthalic acid, linoleic acid, maleic acid in quantity up to about 15% by weight of the phthalic acid, and a fusible phenol-formaldehyde-zinc resinate reaction product dissolved in a natural resin.

5. A composition of matter suitable for use as a vehicle for coating compositions, comprising the reaction product of glycerol, phthalic acid, a fatty acid obtainable upon hydrolysis of a member of the group consisting of fatty oils and fats, an acid of the group consisting of maleic, malic, succinic, tartaric and fumaric acids in an amount not substantially exceeding 15% by weight of the phthalic acid, and a fusible, soluble phenol-aldehyde-metal compound reaction product dissolved in a natural resin.

6. A composition of matter suitable for use as a vehicle for coating composition, comprising the reaction product of glycerol, phthalic acid, linoleic acid, maleic acid in an amount not substantially exceeding 15% by weight of the phthalic acid, and a fusible, soluble phenol-formaldehyde-organic zinc salt reaction product.

7. A composition of matter suitable for use as a vehicle for coating compositions, comprising the reaction product of glycerol, phthalic acid, linoleic acid, maleic acid in an amount not substantially exceeding 15% by weight of the phthalic acid, a fusible, soluble phenol-aldehyde condensate, and boric acid.

8. The method of producing an oil-soluble material suitable for use in coating compositions, consisting in reacting a polyhydric alcohol, phthalic acid, a dicarboxylic aliphatic acid of the group consisting of maleic, malic, succinic, tartaric and fumaric acids in an amount not substantially exceeding 15% by weight of the phthalic acid, the acids obtainable on hydrolysis of a fatty oil, and boric acid.

9. An oil-soluble resinous material consisting substantially of the reaction product of a polyhydric alcohol, phthalic acid, a dicarboxylic aliphatic acid of the group consisting of maleic, malic, succinic, tartaric and fumaric acids in an amount not substantially exceeding 15% by weight of the phthalic acid, the acids obtainable on hydrolysis of a fatty oil, and boric acid.

10. The method of producing an oil-soluble resinous material suitable for use as a vehicle for coating compositions which comprises reacting glycerol, phthalic acid, the acids obtainable on hydrolysis of a fatty oil, up to 15 per cent by weight of a dicarboxylic aliphatic acid of the group consisting of maleic, malic, succinic, tartaric and fumaric acids based upon the quantity of phthalic acid, and at least one member of the group of acidic materials consisting of boric acid and a fusible, soluble condensate of a phenolic body and an aldehyde.

ISRAEL ROSENBLUM.